United States Patent [19]
Peterson

[11] 3,957,023
[45] May 18, 1976

[54] PRESSURE RESPONSIVE ENGINE IGNITION CONTROL SYSTEM

[76] Inventor: M. Maurice Peterson, 1881 Nevada St., Salt Lake City, Utah 84108

[22] Filed: Mar. 29, 1974

[21] Appl. No.: 456,174

[52] U.S. Cl. .................. 123/117 R; 123/146.5 A; 123/148 E
[51] Int. Cl.² ........................................... F02P 5/04
[58] Field of Search ............... 123/119 E, 146.5 A, 123/117 R, 32 EA

[56] References Cited
UNITED STATES PATENTS

| | | | |
|---|---|---|---|
| 2,220,558 | 11/1940 | Van Dijck et al. | 123/117 R X |
| 2,407,652 | 9/1946 | Costa | 123/117 R X |
| 2,621,642 | 12/1952 | Malick | 123/119 E |
| 3,361,929 | 1/1968 | Vandover | 123/148 E X |
| 3,592,178 | 7/1971 | Schiff | 123/117 R X |
| 3,875,912 | 4/1975 | Bullo | 123/146.5 A X |

Primary Examiner—Charles J. Myhre
Assistant Examiner—Tony Argenbright
Attorney, Agent, or Firm—Criddle, Thorpe & Western

[57] ABSTRACT

An ignition control system for use in internal combustion engines includes apparatus for sensing maximum pressure due to combustion in an engine combustion chamber during one cycle of operation, for determining when a rotatable member of the engine rotates through a certain predetermined angular position, and for adjusting the ignition timing on a subsequent cycle so that the occurrence of maximum pressure in the chamber coincides with rotation of the rotating member through the predetermined angular position.

13 Claims, 5 Drawing Figures

PRESSURE RESPONSIVE ENGINE IGNITION CONTROL SYSTEM

BACKGROUND OF THE INVENTION

This invention relates to apparatus for ignition timing control systems for internal combustion engines.

Ignition control systems in current use typically provide for controlling ignition timing in response to conditions developed within the engine immediately prior to the igniting of the fuel charge. Angular velocity of the engines cam shaft and intake manifold vacuum, for example, are commonly used to regulate such timing. It has also been proposed, in U.S. Pat. No. 3,361,929, that firing chamber pressure be used to induce the spark plug firing for that chamber. While such prior arrangements have been improved over the years to provide a fair degree of reliability and accuracy, such systems nevertheless require frequent adjustment and such adjustment is oftentimes dependent upon the skill of the person performing the adjustment.

In recent years, it has been recognized as desirable, from a cost, performance, and reliability standpoint, to utilize electronic circuitry wherever possible in the operation and control of internal combustion engines and the like. Thus, alternators, electronic voltage regulators, electronic fuel injection systems and electronic ignition systems have been developed and are now widely used.

To my knowledge, there has not heretofore been available an electronic system for controlling the firing of a combustion chamber based upon an earlier comparison of the time maximum combustion pressure is developed in the chamber with the time a rotating member of the engine rotates through some predetermined optimum angular position at which the firing or maximum pressure ought to occur.

SUMMARY OF THE INVENTION

It is an object of the present invention, in view of the above-described arrangements, to provide a system for timing the ignition of fuel charges in an internal combustion engine such that ignition will occur at some predetermined optimum condition of the engine.

It is another object of the present invention to provide an ignition control system which requires little maintenance and yet is reliable and provides greater precision than heretofore obtained.

It is still another object of the present invention to provide such a system in which ignition in each combustion chamber of an internal combustion engine is controlled so that the maximum pressure, due to combustion, in the chamber substantially coincides with rotation of a rotating member of the engine through some predetermined angular position.

These and other objects of the present invention are realized in a specific illustrative embodiment which includes apparatus for monitoring the pressure in the combustion chamber of an engine, apparatus for determining when a rotatable member of the engine rotates through a predetermined angular position at which maximum pressure should ideally occur, and apparatus for adjusting the ignition timing of the chamber so that the occurrence of maximum pressure substantially coincides with the rotation of the rotating member through the predetermined angular position. In other words, the combustion chamber is monitored to determine ignition or firing error during one cycle of operation and the ignition timing for subsequent cycles is adjusted to reduce such error.

In accordance with another aspect of the invention, the firing error as determined for one chamber may be used to adjust the ignition timing for one or more other combustion chambers of the engine.

BRIEF DESCRIPTION OF THE DRAWINGS

A complete understanding of the present invention and of the above and other objects and advantages thereof may be gained from a consideration of the following detailed description of an illustrative embodiment presented in connection with the accompanying drawings in which.

DETAILED DESCRIPTION

Figure 1:
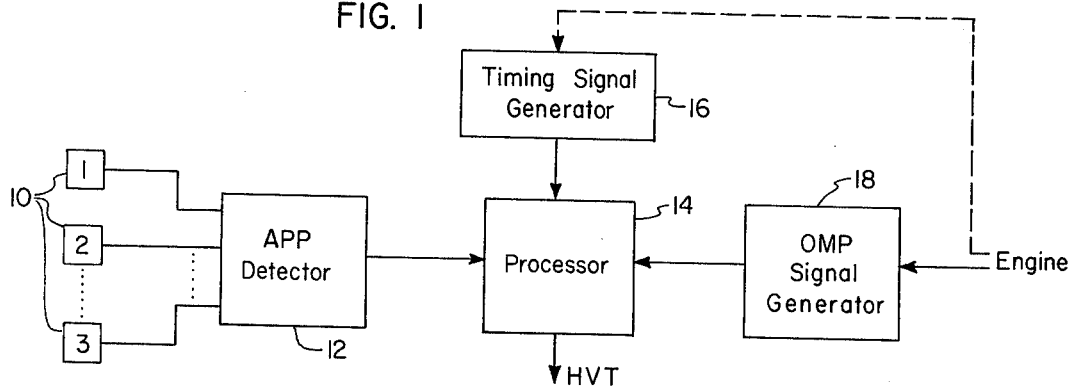
FIG. 1 is an overall system block diagram of one illustrative embodiment of the present invention.

To aid in the description of the illustrated preferred embodiment of the invention, the following terms and mnemonics shall be defined as follows:

APP -- Actual Peak Pressure: The maximum pressure occurring in a combustion chamber due to combustion.

OMP -- Optimum Maximum Pressure: The angular position of the rotating components of an engine at which maximum pressure due to combustion should ideally occur in a combustion chamber.

DSP -- Distributor Sprocket Pulses: Pulses, which are generated, as by a distributor, and evenly spaced with respect to engine rotation. As described herein, there will be 256 Distributor Sprocket Pulses (DSP's) between each successive occurrence of Optimum Maximum Pressure (OMP).

HVT -- High Voltage Trigger: A signal or logic level developed by the ignition control system of the present invention to initiate generation of high voltage for a spark to ignite the fuel charge in a combustion chamber. ESC -- Engine Start Clear: A signal or logic level developed by the ignition control system of the present invention for a short period of time during start up of the engine.

STC -- Start Timing Count: A signal or logic level used to initiate certain counting and timing operations in the ignition control system of the present invention.

Standard binary logic terminology will also be used throughout the following description. For example, "high" or "high level" will be used synonymously with "logical one", and "low" or "low level" will be used synonymously with "logical zero." The described system of the invention includes a number of conventional electronic devices having special operating characteristics. The devices used and their characteristics are as follows:

JK Flip-Flop -- This flip-flop has two stable states with corresponding outputs identified as Q and $\overline{Q}$. With the flip-flop inputs J and K high, a clock input will change the state of the flip-flop. With the inputs J and K low, the clock input will not change the state of the flip-flop. With the input J high and the input K low, the clock input will establish a high Q output and a low $\overline{Q}$ output. With the input J low and the input K high, the clock input will establish a low Q output and a high $\overline{Q}$ output. The JK flip-flop also includes a "clear" input which, when made low, will cause the Q output to be made low. (Throughout the following discussion, any term with a bar over it will be the complement [negation] of the same term without the bar.)

UP-DN Counter--A binary counter having UP, DN, load, and reset inputs such that if the UP input is held high and the DN is clocked, the counter will count down to a lower count and if the DN input is held high and the UP input is clocked the counter will count up to a higher count. If the load input is held low the counter will load to a count corresponding to the contents of data being presented to the counter. If the reset input is held high, the counter wil reset to zero so that all outputs of the counter are low.

Three State Buffer--A buffer unit wherein if a disable input is held high, the unit presents a high impedance so that no data may be transferred therethrough. If the disable input is held low, the buffer is enabled and data may be transferred through the buffer unit to a bus. The enabled buffer will control the bus if other buffers coupled to the bus are disabled. Presettable Up Counter -- A binary counter in which input clock pulses will increase the count. When the maximum count registerable in the counter is reached, a carry output will be made high. When a load input is held low the counter will load to a count corresponding to the contents of data being presented to the counter.

Divide-by-n-Counter-Decoder -- A counter/decoder having $n$ outputs. The counter places a high on one and only one of its outputs at a time with the output on which the high condition is placed changing in sequence each time the counter receives a clock input. The clock input following the condition where output $n$ is high will cause output 1 to go high.

Referring now to FIG. 1, there is shown a block diagram of one illustrative embodiment of an ignition control system made in accordance with the present invention. The system includes an APP detector 12 for monitoring each of 1 through n combustion chambers 10 of an internal combustion engine. Each time a fuel charge is ignited in one of the combustion chambers 10, the APP detector 12 applies a signal to a processor 14 just as maximum peak pressure occurs in that chamber.

The processor 14 is also coupled to an OMP signal generator 18 and to a timing signal generator 16. The OMP signal generator 18 applies a signal to the processor 14 each time a rotating member of the engine rotates through some predetermined angular position or positions. That is, the OMP signal generator 18 responds to a rotating member of the engine and when the rotating member is at a particular position, the generator 18 applies a signal to the processor 14. The timing signal generator 16 may either be arranged to generate a train of clock pulses in response to and whose frequency is dependent upon the rotation of the rotating member of the engine, or to generate such pulses independently of the engine. In either case, the timing signal generator 16 applies clock pulses to the processor 14.

The processor 14 generates an HVT signal which, as described earlier, initiates generation of a high voltage for a spark for one of the chambers 10. For example, the HVT signal might be applied to the device that will produce a coincident high voltage pulse that will be applied to a conventional distributor to cause the distributor to generate a spark for the next combustion chamber to be fired.

The time at which the processor 14 generates the HVT signal is dependent upon the time between receipt of a signal from APP detector (APP signal) and of a signal from the OMP signal generator 18 (OMP signal). If the APP signal occurs before the OMP signal for a particular chamber, the ignition for that chamber has occurred too early. On the other hand, if the OMP signal occurs before the APP signal, then ignition has occurred too late. The processor 14 responds to the APP and OMP signals during one cycle of operation by adjusting the time at which the HVT signal is generated so that the generation of the APP signal and the OMP signal in the next cycle are substantially coincident.

In effect, the system of FIG. 1 compares the time of occurrence of maximum pressure in a combustion chamber with the time at which a rotating member of the engine rotates through a predetermined angular position and adjusts the firing in that chamber during the next cycle. The predetermined angular position of the rotating member is that position which is optimum for combustion in a particular chamber. Of course, for multiple chambers, there may be several optimum angular positions, one for each chamber. In any case, in optimum angular position may be determined as the position at which maximum power is achieved, the position at which maximum torque from combustion is obtained, or the position at which any other parameter of the engine is maximized. After such angular position or positions are determined, the OMP signal generator 18 is arranged to generate a signal when a rotating member of the engine rotates through such position or positions.

Although the FIG. 1 arrangement indicates that each of a plurality of combustion chambers 1 through n is monitored, it will be obvious that the system could be arranged so that only a single combustion chamber is monitored and the processor 14 is caused to generate HVT signals for all the chambers 1 through n, timed on the basis of the monitoring of the one chamber. Alternatively, one chamber could be monitored and the time of next firing that chamber adjusted according to such monitoring, etc. for the other chambers. The basic idea is that the occurrence of maximum pressure in a chamber be monitored and compared with the time at which a rotating member of the engine rotates through a predetermined angular position and then the time of subsequently firing that or other chambers be adjusted according to the result of such comparision.

Figure 2:
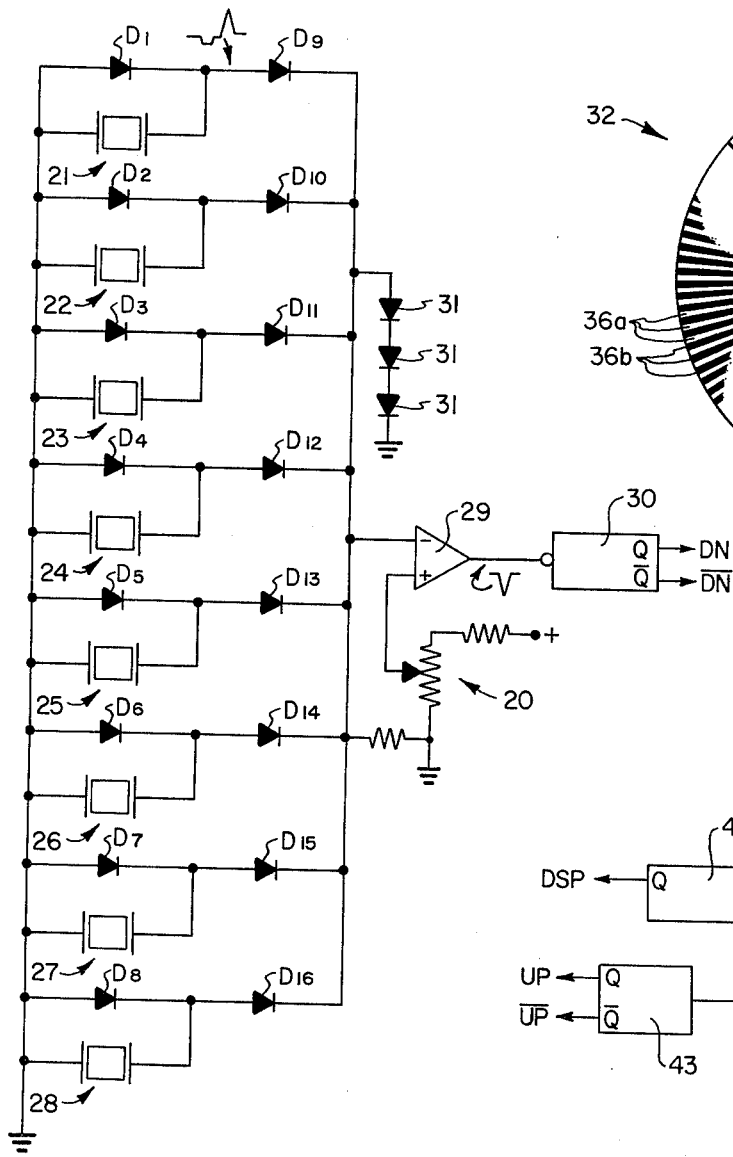
FIG. 2 shows one illustrative embodiment of the APP detector of FIG. 1.

FIG. 2 shows one illustrative embodiment of the APP detector 12 of FIG. 1. The embodiment there shown is specifically adapted to an engine having eight combustion chambers but it will be apparent that it could as well be used on any engine having one or more combustion chambers. The detector includes eight piezoelectric crystals 21–28 each of which are subjected to the pressure within a different combustion chamber of an engine, not shown, to function as pressure sensors. The crystals or sensors 21–28 may each be mounted within the walls of a combustion chamber so as to be exposed to the pressure developed therein, or each may be constructed as an integral part of a spark plug inserted into a corresponding chamber. As another alternative, the pressure sensors 21–28 may be formed as inserts to be threaded into the chambers, through which the spark plugs are formed, or may otherwise be exposed to the chamber pressure. The particular mounting of the pressure sensors in the combustion chamber is not shown since it will be obvious that any suitable mounting arrangement can be used.

One side of each of the piezoelectric sensors is coupled to ground while the other side is coupled to a junction between a corresponding pair of diodes. The sensors are each polled such that the output of the ungrounded side of the sensor is negative-going upon the sensing of a pressure increase by the sensor. (The characteristics and pressure responsive functions performed by piezoelectric crystals are well known in the art.) This output will be negative so long as the pressure is increasing and then it will become positive when the pressure begins to decrease. The output of a sensor will therefor change from negative to positive when the pressure reaches its maximum, i.e., when the pressure begins to decrease after having increased. The ungrounded side of each of the crystals 21–28 is coupled by way of a corresponding diode D1–D8 to a ground potential to thereby clamp the negative-most excursion of the voltage generated by the crystals to nearly ground potential. This results in charging the capacitive component of the crystal in such a manner as to enhance the positive excursion which follows. When peak pressure occurs, the postive swing beings from substantially ground potential, rather than from a negative voltage level, thereby to present a rapidly increasing, positive-going signal. This positive-going signal forward biases correspondingly one of the diodes D9–D16 and the signal is presented to an inverting input of a high gain, voltage, differential amplifier 29. This causes the amplifier 29 to produce a negative output pulse and this indicates the occurrence of peak pressure.

The non-inverting input of the amplifier 29 is referenced to an adjustable positive voltage source represented by a potentiometer 20 one of whose in terminals is connected by way of resistor to a positive voltage supply and the other of whose terminals is connected to ground potential. The wiper terminal of the potentiometer is coupled to the non-inverting input of the amplifier 29. By appropriate adjustment of the wiper terminal of the potentiometer 20, the threshold level of the signal applied to the inverting input of the amplifier 29 necessary to cause generation of the output pulse by the amplifier can be controlled. This enables the user to set the threshold at a level which will prevent false triggering of the amplifier 29; false triggering might otherwise result from small plateaus of pressure change or from other spurious signals.

A string of diodes 31 limits the voltage at the inverting input of the amplifier 29 to the sum of diodes contact potential above ground potential thereby to serve as an over-voltage protector for the amplifier's input. That is, when the voltage on the inverting input of the amplifier 29 exceeds a certain predetermined level, the string of diodes 31 is biased to conduct thus to prevent the voltage from exceeding the predetermined level.

The output of the amplifier 29 is applied to a one-shot or monostable multivibrator 30. The negative-going output of the amplifier 29 triggers the multivibrator 30 into an astable or Q state causing the multivibrator to apply a high signal to its DN output lead and a low signal to its $\overline{DN}$ output. The nature of the operation of one-shot multivibrators is well known in the art. The astable period of all one-shot multivibrators discussed herein might illustratively be in the one to five microsecond range. This is not critical since the multivibrators are used only for pulse shaping.

In operation, each time combustion occurs in one of the combustion chambers associated with the pressure sensors 21-28 the corresponding sensor first detects the increase in pressure and generates a negative seeking signal. Then as soon as the pressure begins to decrease, the sensor generates a positive going signal which forward biases a corresponding one of the diodes D9–D16 and the signal is applied to the amplifier 29. The amplifier 29, in turn, applies a negative pulse to the one-shot multivibrator 30 which assumes its astable state in which a high signal is placed on the DN output, and a low signal on the $\overline{DN}$ output. The generation of these signals thus indicates the occurrence of maximum or peak pressure in one of the combustion chambers, that is, generation of these signals serves as an APP indication.

While the arrangement described in FIG. 2 is a preferred embodiment, pressure sensors other than the piezoelectric type could be used. For example, magnetorestrictive devices, which have a differentiated output similar to that of the arrangement of FIG. 2, could be employed. Other types of devices which have outputs which are proportional to, rather than derivative of, strain or pressure could aslo be used. With such latter arrangements, interposition of a differentiating circuit or circuits between the sensor and a zero crossing detector (amplifier 29 in the illustrated embodiment) might be necessary.

Figure 3:
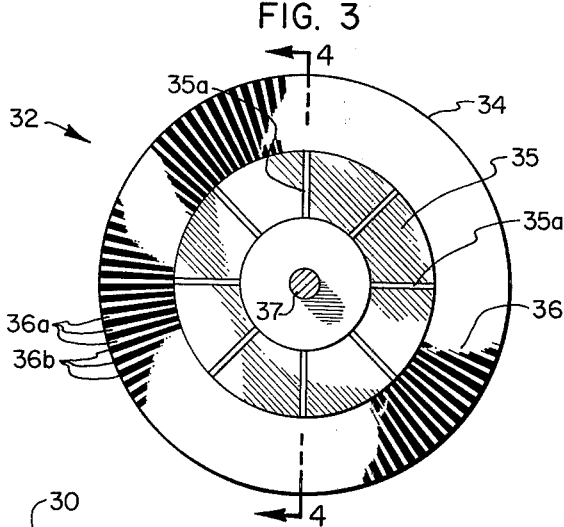
FIGS. 3 and 4 show one illustrative embodiment of the OMP signal generator and the timing signal generator of FIG. 1.
Figure 4:
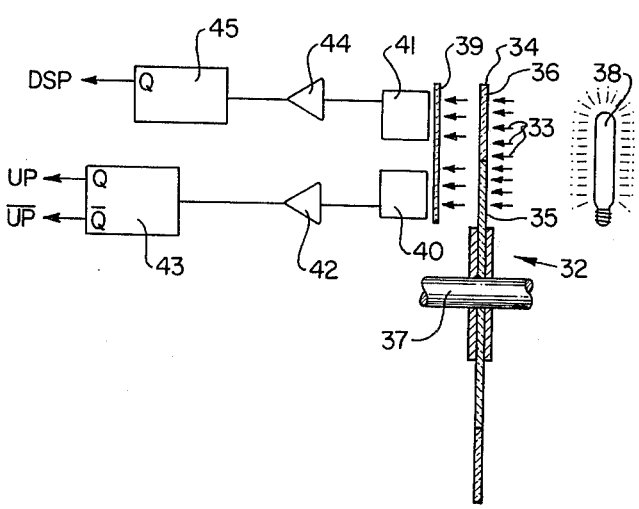

To produce an indication of the OMP, an optical chopper 32, shown in FIGS. 3 and 4, is provided. The optical chopper 32 comprises a disc 34 of transparent material with patterns reproduced upon the disc photographically (FIG. 3). The patterns formed on the disc 34 comprise concentric bands 35 and 36, with the inner band 35 being opaque and having eight radially extending and evenly spaced transparent slots 35a formed therein, and the outer band having two thousand and forty-eight each of alternately transparent (36a) and opaque (36b) radially extending slots, evenly spaced around the band.

The disc 34 is mounted for rotation on a central shaft 37 (FIG. 4). Both the inner and outer patterns are illuminated from one side by a light source 38. For a four-stroke cycle, reciprocating engine, the disc is rotated at half engine speed. This is because combustion for each combustion chamber occurs for every other rotation of the engine's crank shaft. While not shown, it will be apparent that disc 34 can be rotated from any output of the engine, through shaft 37 and that gearing or other transmission means (not shown) can be used to provide the necessary turning ratio.

As the disc 34 rotates, the transparent slots therein will sequentially align with a stationary vertical slit in a fixed plate 39 positioned between the disc 34 and photoelectric sensors 40 and 41. When a transparent slot in the outer band of the disc becomes aligned with the slit in plate 39, sensor 41 is illuminated, and when a transparent slot in the inner band of the disc becomes aligned with the slit in the plate, sensor 40 is illuminated. The inner pattern of the disc is thus arranged such that its respective sensor 40 becomes illuminated at eight evenly spaced intervals for each rotation of the disc, and will remain illuminated for a very small angle of this rotation for each illumination. The outer pattern of the disc is such that its respective associated sensor 41 becomes illuminated at 2,048 evenly spaced intervals for each rotation of the disc. The ratio of light and dark durations on the sensor 41 is not critical, but half light and half dark timing is preferred.

The output of the sensor 40 is amplified by an amplifier 42 which then triggers a one-shot multivibrator 43 to its astable or Q state, causing it to produce a signal representing OMP. This signal is the generation of a high condition on an UP output lead of the multivibrator and a low condition on an UP output lead.

The output of sensor 41 is amplified by an amplifier 44 which then triggers one-shot multivibrator 45 to its astable or Q state causing it to produce a DSP, which will be one of a train of continuously occurring rectangular pulses.

Although optical apparatus has been described for producing indications of the OMP and DSP's (as functions of parameters of the rotating elements of an engine), it should be understood that other alternative arrangements could be employed. For example, a wheel having magnatized portions and magnetic pickup heads couled be employed, as well as many other well known schemes.

Figure 5:
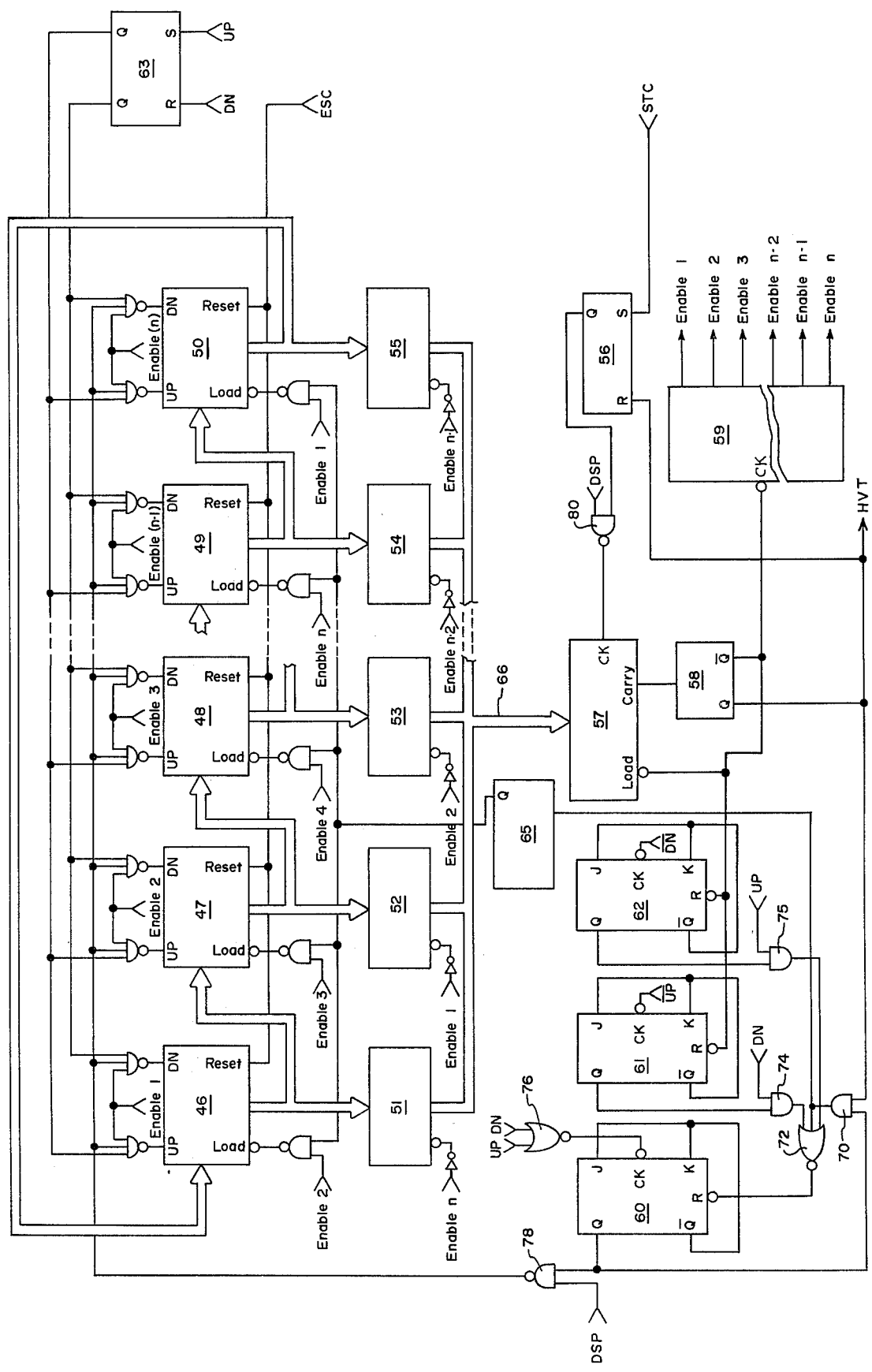
FIG. 5 shows one illustrative embodiment of the processor of FIG. 1.

FIG. 5 illustrates one embodiment of the processor 14 of FIG. 1, i.e., an arrangement by which the data generated by devices of the type shown in FIGS. 2–4 may be processed in order to adjust the ignition timing so that APP and OMP occur very nearly coincidentally. The arrangement includes a plurality of eight bit UP-DN counters 46–50 each of whose outputs is coupled to a corresponding one of a plurality of eight bit three state buffers 51–55. The output of each UP-DN counter is also coupled to the next adjacent UP-DN counter in the sequence, with the output of counter 50 being coupled to counter 46. Although only 5 UP-DN counters and 5 three state buffers are shown, it should be understood that for this embodiment, eight such counters and eight such three state buffers are provided, one each for each chamber of an eight cylinder engine. As will become clear after the description of the FIG. 5 arrangement, UP-DN counters and three state buffers fewer in number than the number of chambers of the engine could be provided, in which case ignition timing for certain chambers would be based upon information obtained from monitoring the APP in other chambers. It is also possible to use UP-DN counters and three state buffers greater in number than the number of chambers of the engine, in which case ignition timing of a given chamber could be adjusted on the basis of count contained in more than one UP-DN counter. One such example would be a system using six UP-DN counters and six three state buffers as a more universal system that could be installed with either a three chamber or a six chamber engine.

The outputs of each of the three state buffers 51–55 are coupled to a data bus input to a presettable eight bit UP counter 57. The counter 57 is clocked via a NAND gate 80 which, in turn, is enabled by an RS flip-flop 56. In this embodiment, the counter 57 is an eight bit counter adapted to count either from zero, or from a count supplied via one of the three state buffers 51–55, up to 255 after which the counter 57 generates a carry output which is applied to a one-shot multivibrator 58. The Q output of the multivibrator 58 provides the HVT described earlier which, in addition to initiating ignition, is also applied to the flip-flop 56 and to logic circuitry associated with JK flip-flop 60 and one sot multivibrator 65. The $\overline{Q}$ output of the multivibrator 58 is applied to a divide-by-n-counter-decoder 59, to a "load" input of the counter 57, and to reset inputs of the JK flip-flops 61 and 62. As also described earlier for a divide-by-n-counter-decoder, one and only one of the outputs of the counter-decoder 59 will be enabled at a time. These outputs are utilized to control the operation and condition of other portions of the logic of FIG. 5.

In operation, power is applied to the system and an ESC lead is held high for a time during and after start of the engine. The generation of the high condition of lead ESC could be accomplished by a simple timing circuit. The timing circuit could be responsive to operation of the ignition switch to generate the high condition for some predetermined period of time, after which a low condition would be generated. Alternatively, a signal generator responsive to a pressure in the intake manifold of the engine could be provided to apply a high condition to lead ESC while the intake manifold pressure was less than a certain level, and to apply a low condition to the lead when the intake manifold pressure exceeded that level, ie., after the engine has "started."

The ESC lead is connected to the reset input of each of the UP-DN counters 46–50 so that when ESC is high, all the counters are maintained at a zero count and the output of all the counters are all zeros. Upon application of power to the system, only one of the outputs of counter-decoder 59 will be made high, so only one of the three state buffers 51–55 will be enabled to pass data from a corresponding UP-DN counter to the counter 57. Assume, for example, that the "enable 1" output of the counter-decoder 59 were high, then the three state buffer 52 would be enabled to pass data from the UP-DN counter 47 to the counter 57. However, at this stage of the operation of the system, the counter 57 is not conditioned to receive and register any data from the data bus 66. In fact, upon application of power to the counter 57 the counter may assume any initial state. At this early stage of the operation of the system, this circumstance is not critical.

Recall the STC was defined earlier as a condition which initiated certain counting operations. This condition or level is applied to flip-flop 56 to set the flip-flop. In the present embodiment, the Q output of the monostable multivibrator 43 of FIG. 4 is utilized as the STC condition so that when the Q output of the multivibrator goes high, the flip-flop 56 is set. (Note that the output of the multivibrator 43 also provides the OMP indication). When flip-flop 56 is set, NAND gate 80 is enabled so that DSP's applied to the NAND gate will, in turn, be applied to the clock input of counter 57. The DSP's, of course, are generated by the monostable multivibrator 45 of FIG. 4. With each DSP received by the counter 57, the counter increments by one count. When the counter 57 reaches a count of 255, it applies a carry output signal to the monostable multivibrator 58. Depending upon the initial turn-on state of the counter 57, this may occur after receipt of 255 DSP's, or less. The carry signal triggers the multivibrator 58 to its astable state in which it generates a high condition on its Q output and a low condition on its $\overline{Q}$ output. The high condition on the Q output serves as the HVT, described earlier, to initiate ignition in one of the chambers. This so-called "wild" ignition (because of the indeterminate state of counter 57 when the system is turned on) will cause no trouble since it occurs early in the cranking of the engine.

The high condition on the Q output of the multivibrator output 58 also serves to rest the flip-flop 56 to prevent further application of DSP's to the counter 57. The low condition on the $\overline{Q}$ output of the multivibrator 58 causes the counter-decoder 59 to advance by one count and apply an output signal to the next output in sequence, and also causes the JK flip-flops 61 and 62 to be in a reset state. The JK flip-flop 60 will be reset only if it is currently generating a high condition on its Q output so that such high condition may combine with the high condition on the Q output of the multivibrator 58 to enable AND gate 70. If this occurs, then AND gate 70 applies a signal to NOR gate 72 causing it to apply a reset signal to the JK flip-flop 60. (Note that if the JK flip-flop 60 is generating a high condition on its Q output, it is in the set state.)

Finally, the low condition on the $\overline{Q}$ output of multivibrator 58 is applied to the "load" input of the counter 57 causing the counter to load the data then present on the bus 66, i.e., the count from one of the UP-DN counters which at this stage is zero.

The next occurrence of an OMP indication, i.e., STC signal, will set flip-flop 56 to again allow DSP's to be applied via NAND gate 80 to the counter 57. Since the counter 57 was loaded with all zeros, it will begin incrementing from a zero count with receipt of the DSp's. After 255 DPS's have been received, the counter 57 will again produce a carry output signal which will cause the multivibrator 58 to again produce an HVT signal. Since this HVT signal is produced 255 DSP's after occurrence of the OMP indication and since OMP indications occur 256 DSP's apart, the HVT just generated will substantially coincide with the next OMP indication. Triggering the multivibrator 58 also results in the resetting of flip-flop 56, resetting of the JK flip-flops 60–62, advancement of the counter-decoder 59, etc., as described earlier.

Since the generation of the HVT signal is very close in time to the occurrence to the OMP, the combustion chamber firing resulting from this HVT will be productive, i.e., it will not be a "wild" ignition.

As long as the high condition is applied to ESC lead, the above described process is repeated with zeros being loaded from one of the UP-DN counters 46–50 into the counter 57. After a predetermined period of time, a low condition is applied to ESC and this initiates ignition timing adjustment in accordance with the occurrence of APP and OMP. It should be emphasized at this point that the coincidence of the HVT signal and the OMP indication is not the same as a coincidence of APP and an OMP indication. The HVT signal initiates an ignition and, of course, the actual combustion and the occurrence of maximum pressure in the chamber takes place sometime after the generation of the HVT signal. It is the bringing into coincidence of the occurrence of the APP with OMP that is desired and not of the occurrence of the initiation of ignition (HVT) with OMP.

The occurrence of the next OMP indication (corresponding to the UP output of the monostable multivibrator 43 being made high and the $\overline{UP}$ output being made low) will cause flip-flops 60, 61 and 63 to go to thier Q high states. The condition on the UP output causes flip-flops 60 and 63 to go to the Q high state and the condition on the $\overline{UP}$ output lead causes flip-flop 61 to go to the Q high state. With filp-flop 60 with Q high state, NAND gate 78 is enabled to apply DSP's to input gates of the UP-DN counters 46–50. The Q high state of flip-flop 63 will partially enable the UP input gates of the UP-DN counters 46–50. Finally, the one high output of the counter-decoder 59 completes the enablement of one of the UP input gates of the UP-DN counters so that DSP's from the NAND gate 78 may be applied to the UP input of the corresponding UP-DN counter. The particular UP-DN counter will thus begin from the count of zero and count up one count for each DSP.

When APP occurs, as a result of the latest initiation of the ignition, a high condition on the DN output of the multivibrator 30 of FIG. 2 is applied to reset flip-flop 63. Also, this high condition, together with the high Q output of flip-flop 61 causes an AND gate 74 to be enabled which, in turn, causes the NOR gate 72 to apply a reset signal to flip-flop 60 placing the flip-flop in the $\overline{Q}$ high state. This inhibits any further application of DSP's to the particular UP-DN counter. The count in this counter now corresponds to the number of DSP's that APP occurred after the occurrence of the OMP. That is, had ignition occurred that number of DSP's earlier, APP and OMP would coincide. Of course, the other UP-DN counters still contain counts of zero. The above operation will repeat with the next occurrence OMP, HVT and APP. Each HVT will cause the counter-decoder 59 to advance its high output to the next output line thus enabling the next UP-DN counter in succession. After all UP-DN counters have been so enabled, each will contain a count other than zero.

To further clarify the above operation, assume that as a result of the occurrence of OMP, UP-DN counter 50 is enabled (the "enable n" output of counter-decoder 59 being high) to increment with each DSP applied thereto. When APP occurs, the UP-DN counter 50 stops UP counting. While this is going on, the "enable n" output of the counter-decoder 59 will have enabled the buffer 51 to transfer to the counter 57 the count stored in the UP-DN counter 46, this count being other than zero. The counter 57, upon the occurrence of OMP, will then have commenced incrementing from this count with each DSP received. When the counter 57 reaches a count of 255 (after receipt of less than 255 DSP's, of course), it causes generation of an HVT signal. The HVT signal resets flip-flop 56 and causes the counter-decoder 59 to place a high condition on the "enable 1" output to enable loading the contents of the UP-DN counter 47 into the counter 57.

If the next OMP indication still occurs before APP (indicating that ignition is occurring too late), then flip-flops 60, 61 and 63 are set to the Q high state and UP-DN counter 46 and counter 57 began incrementing in response to DSP's (remember that the "enable 1" output of the counter-decoder 59 is high to allow UP-DN counter 46 to increment). UP-DN counter 46 increments until the next APP occurs and counter 57 increments until it reaches a counter of 255. The effect of incrementing the count in counter 46 will be to advance the firing in a corresponding combustion chamber in the next cycle, i.e., after the count in counter 46 is loaded into counter 57 and counter 57 produces a carry output which causes generation of the HVT signal. Upon occurrence of APP, AND gate 74 will be enabled to apply a reset signal via NOR gate 72 to reset flip-flop 60 and prevent further application of DSP's to the counter 46.

If, in the previous example, APP occurs before OMP (indicating that ignition is occurring too early possibly because of altered engine timing requirements), then flip-flop 63 is placed in $\overline{Q}$ high state (by the high condition on the DN output of multivibrator 30 of FIG. 2) and flip-flops 60 and 62 are placed in the Q high state. With flip-flop 63 in the $\overline{Q}$ high state and the "enable 1" output of counter-decoder 59 being high, DSP's are applied to the DN input of counter 46 to cause the counter to decrement. Such decrementation continues until OMP next occurs. The effect of this decrementing will be retard the next firing in the combustion chamber corresponding to counter 46. Upon occurrence of OMP, AND gate 75 is enabled to apply a reset signal via NOR gate 72 to reset flip-flop 60 and prevent further application of DSP's to the counter 46.

The above-described operation of either incrementing or decrementing each of the UP-DN counters 46-50 will continue, with such incrementing or decrementing reflecting the time difference between occurrence of APP and OMP for a corresponding combustion chamber. On the next cycle following such incrementing or decrementing, the APP and OMP for a given combustion chamber should be in substantial coincidence, unless operating conditions of the engine have altered the requirements of ignition timing. Such alterations, however, would be compensated for in the next following cycle, etc.

It might be noted that in the herein described embodiment, it does not make any difference whether or not an output of the divide-by-n-counter-decoder 59 is in correspondence with a given combustion chamber. For instance, UP-DN counter 46 might monitor chamber 3 one time the engine is operated and then monitor chamber 5 the next time. It does not matter which UP-DN counter and associated circuitry monitors which chamber since that UP-DN counter will "stay in step" with each successive cycle following the initial cycle.

If the number of UP-DN counters, three state buffers, and outputs on the divide-by-n-counter-decoder 59, along with ancillary gates, etc., is equal to the number of combustion chambers, then each chamber will have its performance individually monitored. If this number is less than the number of chambers, then some chambers may not be monitored and the ignition timing for those chambers would be controlled in response to the monitoring of the other chambers.

In the event a chamber did not fire correctly, incrementing of an UP-DN counter would begin with OMP and would not terminate because on APP would be generated. Such a runaway count will be "detected" by the fact that flip-flpp 60 would still be in the Q high state when HVT is generated. These two high levels would enable AND gate 70 to apply a high level via NOR gate 72 to reset flip-flop 60 and prevent further application of DSP's to the runaway counter. It would then be desirable that the indeterminate count in the counter be replaced by something reasonable, and the count of the previously updated UP-DN counter suffices. Thus, the output of AND gate 70 is supplied to a one-shot multivibrator 65 triggering the multivibrator into the Q high state to partially enable NAND gates coupled to the "load" inputs of the counters 46-50. The NAND gate that is fully enabled is determined by the count in the divide-by-n-counter-decoder 59, which was advanced by one count by the HVT signal. Because of this advance in the count of the counter-decoder 59, the "load enable" of each UP-DN counter corresponds to one count higher than the "count enable." If the runaway count was for counter 47, its count would then be set at the count contained in counter 46, etc.

In a typical operation, upon a production of carry output by counter 57, which initiates ignition by the HVT signal, assume that the count of the counter-decoder 59 has been advanced to "enable 1," the count having been "enable $n$" prior to the HVT. This causes the count of counter 47 to be applied to counter 57 through buffer 52. Counter 46 is then partially enabled so it is ready for either OMP or APP to occur. Its count is then altered to correct for the currently firing chamber's error in timing. If, instead of a successful firing, a misfire occurred, causing a runaway count of counter 46, as the count in counter-decoder 59 advanced to "enable 2", counter 46 would be enabled to load the contents of counter 50. Then counter 48 would load counter 57 through buffer 53 and counter 47 would be readied for incrementing or decrementing.

Although a preferred form of my invention has been herein disclosed, it is to be understood that the present disclosure is made by way of example and that variations are possible without departing from the scope of the hereinafter claimed subject matter.

What is claimed is:

1. In an internal combustion engine having at least one combustion chamber and a rotatable member, a pressure responsive ignition control system for use in said engine comprising means for detecting the occurrence of substantially maximum pressure in the combustion chamber when the chamber is fired, said detecting means including means for monitoring the pressure in said chamber, and means for generating a first signal when the pressure in the chamber begins to decrease after having increased beyond a certain threshold level, means for determining when the rotatable member rotates through a predetermined angular position, and means for adjusting the time of firing in the chamber so that the occurrence of substantially maximum pressure in the chamber substantially coincides with the rotation of the rotatable member through said predetermined, angular position.

2. An ignition control system as in claim 1, wherein said monitoring means comprises a pressure senstive device for developing an electrical signal indicating the pressure in the chamber, and wherein said first signal generating means generates said first signal when the electrical signal exceeds a threshold.

3. An ignition control system as in claim 2, wherein said pressure sensitive device includes a piezoelectric crystal.

4. An ignition control system as in claim 2, wherein said first signal generating means includes a differential amplifier.

5. An ignition control system as in claim 2, wherein said first signal generating means includes means for varying said threshold voltage level.

6. An ignition control system as in claim 1, wherein said determining means comprises means for generating a second signal when the rotatable member rotates through said predetermined angular position, and wherein said adjusting means comprises means for measuring the time between the generation of said first signal and second signal, and means for advancing the time of firing in the chamber in accordance with the time measure if said first signal is generated after said second signal and for retarding the time of firing in accordance with the time measure if said first signal is generated before said second signal.

7. An ignition control system as in claim 6, wherein said second signal generating means comprises a light chopper including
- a disc having a radially extending slit which allows light to pass therethrough, said disc being rotatable in response to rotation of said rotating member,
- a light source positioned on one side of said disc, to project light through said slit when the rotating member rotates through said predetermined angular position, and
- light detecting means positioned on the other side of said disc for generating said second signal when light passing through the slit is detected.

8. An ignition control system as in claim 6, wherein said time measuring means comprises
- an up-down counter for incrementing the count registered therein by an amount corresponding to the time between the generation of said first signal and said second signal when said first signal is generated after said second signal, and for decrementing the count registered therein by an amount corresponding to the time between the generation of said first signal and said second signal when said first signal is generated before said second signal,
- a second counter,
- means for applying the count registered in said up-down counter to said second counter,
- said second counter incrementing from the count applied thereto from the up-down counter to a predetermined count, and
- means for initiating the firing in said chamber when said second counter reaches said predetermined count.

9. In an internal combustion engine having at least one combustion chamber and a rotatable member, a pressure responsive ignition control system for use in said engine comprising
- sensing means for measuring the angular position the rotatable member of the engine each time the combustion chamber is fired, said sensing means including means for monitoring the pressure in said chamber, and means for generating a first electrical signal when the pressure in the chamber begins to decrease after having exceeded a certain threshold level,
- means for comparing the angular position of said rotable member as measured by the sensing means with a predetermined angular position of said rotatable member, and
- means responsive to said comparing means for controlling the time of firing in said combustion chamber so that combustion occurs in the chamber when said rotatable member is substantially at the predetermined angular position.

10. An ignition control system as in claim 9, wherein said comparing means comprises
- means for generating a second electrical signal when the rotatable member is at said predetermined angular position, and
- means for measuring the time between the generation of said first electrical signal and said second electrical signal.

11. An ignition control system as in claim 10, wherein said controlling means comprises means for advancing the time of firing in said chamber if said first electrical signal is generated after said second electrical signal and means for retarding the time of firing if said first electrical signal is generated before said second electrical signal.

12. In an internal combustion engine having a plurality of combustion chambers and a rotating member, a pressure responsive ignition control system for use in said engine comprising
- means for detecting combustion in at least one of said chambers,
- means for generating a signal when the rotatable member rotates through a predetermined angular position, and
- means for adjusting the time of subsequent firing in said one chamber so that the occurrence of combustion substantially coincides with the generation of said signal, said adjusting means including
  - an up-down counter for registering a count therein, said counter being responsive to generation of said signal, if said signal is generated before combustion is detected, for successively incrementing the registered count until combustion in said one chamber is detected, and being responsive to the detection of combustion in said one chamber, if combustion is detected before the generation of said signal, for successively decrementing the registered count until said signal is generated,
  - a second counter,
  - means for applying the count registered in said up-down counter to said second counter,
  - said second counter incrementing from the count applied thereto from the up-down counter to a predetermined count, and
  - means for causing firing in one or more of said chambers when said second counter reaches said predetermined count.

13. An ignition control system as in claim 12 further including means for resetting said up-down counter to a predetermined count a certain period of time following generation of said signal if combustion is not detected within said certain period of time.

* * * * *